Patented July 2, 1940

2,206,677

UNITED STATES PATENT OFFICE 2,206,677

METHOD AND MEANS FOR PREPARING WELLS FOR CEMENTING

Jeff H. Shepler, Houston, Tex.

No Drawing. Application April 8, 1939,
Serial No. 266,885

6 Claims. (Cl. 166—21)

My invention relates generally to improvements in the art of drilling and constructing wells, and particularly to methods and compounds used in preparing a drilled oil well for reception of the cementing operations whereby the casing is installed, and an important object of the invention is to effect desirable changes in the wall contour, and chemical and physical changes in the character, of the interior of the well hole resulting from the drilling with mud, whereby the cement material used in sealing the casing in the well sets more quickly and imperfections in the sealing are eliminated.

Other important objects and advantages of my invention will be apparent from a reading of the following description and the examples given therein for illustrative purposes.

After the casing is inserted in the drill hole it is common practice to cement this casing to the walls of the drill hole so as to hold the casing firmly in position in the hole and prevent gas passing between the walls of the hole and the casing to cause a "blowout," and to prevent passage of water between the walls of the hole and the casing which would cause contamination of the oil or gas as it is taken from the well. As a result of the drilling operations the drilling mud sticks to the walls of the drill hole and exhibits hollows and projecting fingers which if not eliminated in some manner cause channelling of the cement therein causing poor cementing and insufficient sealing of the casing in the well.

I have discovered that the objectionable projecting fingers and hollows may be substantially eliminated by pumping down through the casing into the well, ahead of the cement, a compound prepared at the surface and composed of sponge material, water, and inert material. The cement and this compound may be pumped into the well at the same time with the compound ahead of the cement, and at regular pump pressures. As the compound reaches the lower end of the casing it starts upwardly around the casing and passes between it and the wall of the drill hole and in so doing cuts away the projecting fingers and unevenness from the wall of the well hole and produces a smooth even surface thereon ensuring even and thorough application of the cement as regards the walls of the drill hole, and causing the well hole to have a substantially uniform diameter with equal spacing surrounding the casing inserted therein. The operation of the invention does not remove all of the deposit of drilling fluid on the well hole wall but cuts it so as to leave a thin shell thereof which is sufficiently durable and compact in character to enable complete cement sealing of the well.

Besides having the physical actions mentioned above the present invention effects cleaning of the sides of the casing and of the wall of the hole of the chloride containing drill mud so that the cement can make a clean contact with the casing and with the well wall, and not be contaminated and weakened by the presence of the mud, and retarded as to setting.

Suitable material for the purposes described comprises volcanic ash in a powdered form or volcanic ash mixed with materials such as wood pulp, paper pulp, sponge and similar materials, these acting to bring the laminar flow from the hydraulic pumps to a minimum and to act as a cutting material. Volcanic ash is a product of extinct volcanoes and is found in deposits at or near the surface of the earth in many localities. The volcanic ash is itself an abrasive. When mixed with the other materials mentioned the abrasive or cutting action is increased which at the same time the laminar flow is brought to a minimum.

The preferred embodiment of the compound may consist of approximately 5% of shredded or comminuted sponge ranging from $\frac{1}{16}''$ to $\frac{1}{4}''$ in diameter, added to the volcanic ash and/or tuff, together with water.

Although I have set forth and described herein preferred embodiments of the substance and method of the present invention, it is to be definitely understood that I do not desire to limit the application of my invention thereto, and any change or changes may be made therein within the spirit of the invention and the scope of the subjoined claims.

Having described the invention, what is claimed as new is:

1. The method of cleaning mudded well bores which comprises pumping down through the casing in said well bore a fluid mass consisting of a mixture of water, a sponge material and an abrasive inert material in such a manner that the fluid mass will pass upwardly in said well bore between the wall thereof and said casing to cause an abrading of said mud coating and removal of said coating from said bore.

2. The method of preparing a well for cementing after having drilled the hole with the aid of a mud laden drilling fluid and having inserted the casing in the hole, which comprises pumping down through said casing ahead of the cement, a mixture of water, sponge material and an abrasive inert material in such a manner that said mixture will pass upwardly in said well between the wall thereof and said casing to clean the drilling mud from the casing and from the wall and enlarge and smooth the wall.

3. The method of preparing a well for cementing after having drilled the hole with the aid of a mud laden drilling fluid and having inserted the casing in the hole, which comprises pumping down through said casing ahead of the cement, a fluid containing comminuted sponge having inert abrasive material such as volcanic ash incorporated therein, in such a manner that said fluid will pass upwardly in said well between the wall thereof and said casing to clean the drilling mud from the casing and from the wall and enlarge and smooth the wall.

4. A method of cementing a casing in a drill hole, said method comprising pumping down through the casing a fluid mass containing comminuted sponge having inert abrasive material such as volcanic ash incorporated therein, so as to cause the mass to pass upwardly in the drill hole between the wall thereof and the casing in a manner to abrade the drilling mud present on the wall of the drill hole and to restore the porosity of the wall prior to pumping the cement into the casing, and then pumping the cement into the casing.

5. A well cleaning fluid of the character described consisting of a mixture of volcanic ash and comminuted sponge dispersed in water.

6. A well cleaning fluid of the character described consisting of a mixture of comminuted wood or paper pulp and insert abrasive material such as volcanic ash dispersed in water.

JEFF H. SHEPLER.